L. Wharton,

Clamp.

No. 106,900. Patented Aug. 30, 1870.

Witnesses:-

Joe L. Peyton,
Benj. H. Rowe,

Inventor

Levi Wharton
by his Atty
Wm. D. Baldwin

United States Patent Office.

LEVI WHARTON, OF SALEM, OHIO.

Letters Patent No. 106,900, dated August 30, 1870.

IMPROVEMENT IN CLAMP.

The Schedule referred to in these Letters Patent and making part of the same.

*To all whom it may concern:*

Be it known that I, LEVI WHARTON, of Salem, in the county of Columbiana and State of Ohio, have invented a new and useful Improvement in Screw-Clamps, of which the following is a full, clear, and exact description.

My invention relates to an improvement in clamps, such as are used by wood-workers and others for clamping their work.

Its object is to produce a simple, strong, and easily-adjustable screw-clamp, that obviates the necessity of using a very long screw or turning it many times to clamp the work; and The improvement consists in using a ratchet bar, in combination with an S-link and a set-screw.

In the accompanying drawing—

Figure 1:
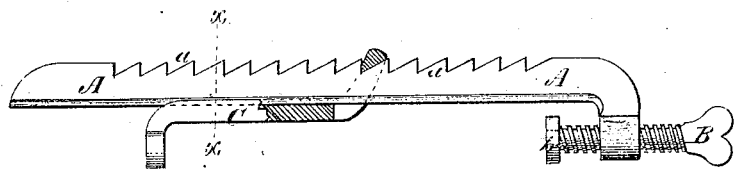
Figure 2:
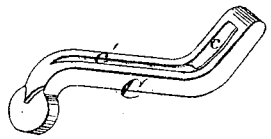

Figure 1 is a side elevation of my improvement, with part of the link broken away;

Figure 2, a perspective view of the link; and

Figure 3:

Figure 3, a cross-section taken in the line $x$ $x$ of fig. 1.

The bar A is formed with a toothed rack, $a$, on one of its edges, and having the corners of the lower edge chamfered to a V or hatchet-edge, as clearly shown in fig. 3. The bar A also has one of its ends bent at right angles to its length.

A thread tapped through it receives the set-screw B, which is of usual form, and has a collar, $b$, turning loosely on one of its ends. The collar impinges against the work to be clamped, and allows the screw to be turned independently of it.

The link C is of peculiar form, having one of its ends bent at right angles to its length, and corresponding in shape with the collar $b$ of the set-screw.

The other end of the link is curved in the opposite direction, and has a slot, $c$, passing transversely through it, forming a stirrup, which embraces the bar A and engages in its teeth.

The link C has also a V-groove, $c'$, passing along its upper side, and formed to receive the hatchet edge of the bar A, which prevents a lateral movement of the link.

In operation the link may be adjusted to a close approximation to the size of the work, and thus necessitate but a short movement of the screw.

I do not claim, broadly, screw-clamps constructed with an adjustable arm, this construction being common. G. D. Lambert's patent of March 8, 1870, may be regarded as a type of this class. In that patent the rack is below the bar, and a spring is used to keep the teeth of the adjustable arm in contact with those of the rack, while in my improved clamp I substitute a link for the arm and dispense with the spring, thus securing a cheaper, simpler, and more efficient instrument.

I claim as my invention—

The combination of the bar, having a V-shaped edge on one side, a ratchet on the other side, a nut for the clamp-screw, and the clamping-screw, with the S-shaped link, slotted at one end to embrace the bar, grooved on one side correspondingly with the V-shaped edge of the bar, and having a clamping-head on the other end, all these parts being constructed to operate in combination as hereinbefore set forth.

In testimony whereof I have hereunto subscribed my name.

LEVI WHARTON.

Witnesses:
R. V. HAMPSON,
NATHAN HUNT.